(12) United States Patent
Braden

(10) Patent No.: US 6,272,786 B1
(45) Date of Patent: Aug. 14, 2001

(54) WEEDLESS FISHING LURE INCLUDING ADJUSTABLE TENSION MECHANISM

(76) Inventor: Daniel L. Braden, 23020 L Dr. North, Marshall, MI (US) 49068

( * ) Notice: Subject to any disclaimer, the term of this patent is extended or adjusted under 35 U.S.C. 154(b) by 0 days.

(21) Appl. No.: 09/378,436

(22) Filed: Aug. 20, 1999

(51) Int. Cl.[7] ................................................ A01K 85/00
(52) U.S. Cl. ............................................................. 43/42.41
(58) Field of Search ................................ 43/34–37, 42.1, 43/42.4, 42.41, 42.42

(56) References Cited

U.S. PATENT DOCUMENTS

| | | |
|---|---|---|
| 1,345,173 | 6/1920 | Halder . |
| 1,434,204 | 10/1922 | Grounsell . |
| 1,808,565 | 6/1931 | McLaughlin . |
| 2,254,949 | 9/1941 | Messacar . |
| 2,517,299 | 8/1950 | Gaylord . |
| 2,547,279 | 4/1951 | Patterson . |
| 2,582,627 | 1/1952 | Gaylord . |
| 3,497,985 | 3/1970 | Margulies . |
| 3,631,624 | 1/1972 | Edde . |
| 3,657,836 * | 4/1972 | Harris .................................. 43/42.41 |
| 3,685,191 | 8/1972 | Metzger . |
| 3,818,626 | 6/1974 | Peippo . |
| 3,902,265 | 9/1975 | Pond . |
| 3,908,298 | 9/1975 | Strader . |
| 4,054,004 * | 10/1977 | Schott ................................. 43/42.09 |
| 4,064,646 * | 12/1977 | Vercellone et al. ................. 43/42.41 |
| 4,367,607 * | 1/1983 | Hedman ............................... 43/42.1 |
| 4,782,618 | 11/1988 | Rainey . |
| 5,090,151 | 2/1992 | Salminen . |
| 5,142,810 | 9/1992 | Radtchenko . |
| 5,161,323 | 11/1992 | Braden . |
| 5,367,818 * | 11/1994 | Aduana ............................... 43/42.44 |
| 5,440,830 | 8/1995 | Smith . |
| 5,628,138 * | 5/1997 | Murray, Jr. .............................. 43/35 |
| 5,806,233 * | 9/1998 | Murphy ............................... 43/42.04 |
| 5,878,524 * | 3/1999 | Braden ..................................... 43/35 |
| 6,105,303 * | 8/2000 | Hall, Sr. ............................. 43/42.04 |

* cited by examiner

Primary Examiner—Peter M. Poon
Assistant Examiner—Kevin Jakel
(74) Attorney, Agent, or Firm—Flynn, Thiel, Boutell & Tanis, P.C.

(57) ABSTRACT

A weedless fishing lure is formed by a lure body and a hook releasably secured to the lure body by an adjustable tensioning mechanism. The adjustable tensioning mechanism is positioned on the lure body for adjusting the tensioning force which holds the hook in the lure body. The lure body includes a through passage for the fishing line and a channel for receiving the hook.

17 Claims, 2 Drawing Sheets

WEEDLESS FISHING LURE INCLUDING ADJUSTABLE TENSION MECHANISM

FIELD OF THE INVENTION

The present invention relates to fishing lures, and more particularly to weedless fishing lures having a hook mounted in and detachable from a lure body.

BACKGROUND OF THE INVENTION

Conventional fishing lures typically are unitary lure bodies which are secured to the fishing line intermediate the hook and the fishing pole. These lures are constructed in numerous shapes, colors, etc. to attract fish which mistakenly identify the lure as food and strike thereat. The fish then, hopefully, becomes ensnared on the hook.

However, many of these lures have a significant drawback when the hook is attached to and extends outwardly of the lure body. These hooks can retard the passage of the lure and hook through the water since typical hooks have a crook and barb which can snag on weeds or debris in the water and thus become entangled. The fisherman must then disentangle the hook or give up the hook and possibly the lure if it is hopelessly entangled. The loss of numerous lures can become expensive, and thus a fisherman may spend considerable time attempting to recover the entangled hook and lure. Yet, such action impinges on the time the fisherman could actually be fishing. In any event, the fisherman must take the time to completely reattach a new lure or the recovered, and possibly damaged, lure on his line in order to continue fishing.

As a result, it is desirable to have a hook releasably attached to the lure body, wherein the hook is retracted during casting and is released upon a fish biting the lure body. The hook is initially concealed by the lure body to assist in preventing the hook from becoming entangled in debris and/or weeds. These lures are commonly called "weedless" lures. Examples of such fishing lures are found in U.S. Pat. Nos. 1,345,173, 1,434,204, 1,808,565, 3,497,985, 3,818,626, 4,782,618, 5,161,323, and 5,440,830.

For example, one prior weedless lure includes a spring finger cantilevered to the hook, which spring finger engages the lure body to hold the hook therein. When a fish strikes such a lure it engages the lure body in a retracted position to such an extent that it overcomes the holding force generated by the spring finger and releases the hook from the lure body. The fish is now ensnared, i.e., "hooked", on the hook which is free from the lure body. However, the force generated by the spring finger is a fixed force depending on the resilience of the finger and the size of the cavity in which it is placed.

A further drawback of this prior weedless fishing lure is the lure body only has a single passage for receiving both the hook and the fishing line. Thus, intricate and precise threading of the fishing line is required for the weedless fishing lure to operate correctly. More specifically, the fishing line must be threaded to pass along one side of a pin so that the hook and attached fishing line pass an opposite side of the pin. That is, the fishing line turns 180 degrees around the pin when the hook is mounted within the lure body. This can be a significant difficulty for those fishermen without a steady hand or who fish in relatively cold temperatures which can significantly reduce finger dexterity.

A further drawback of some prior fishing lures is a relatively complex coiled spring structure for releasing the hook from the lure body. Such structures are difficult to set and an incorrect setting of the spring structure can result in loss of a fish do to jamming at the time the fish strikes and nonrelease of the hook. An incorrect setting can also result in a premature release of the spring and hence the hook so that the assembled lure is no longer weedless as the hook is free of the lure body before a fish has struck and can entangle in debris.

Accordingly, it is an object of this invention to provide a weedless fishing lure including an adjustable tensioning mechanism which secures the hook to the lure body until struck by a fish. Such a tensioning mechanism is movably secured to the lure body for adjusting the tension holding the hook in the lure body. It is a further object of the invention to provide a fishing lure with a passage for receiving the fishing line therethrough and a separate channel in which the hook is mounted.

Other objects and purposes of the invention will be apparent to persons familiar with devices of this general type upon reading the specification and inspecting the accompanying drawings.

Figure 1:
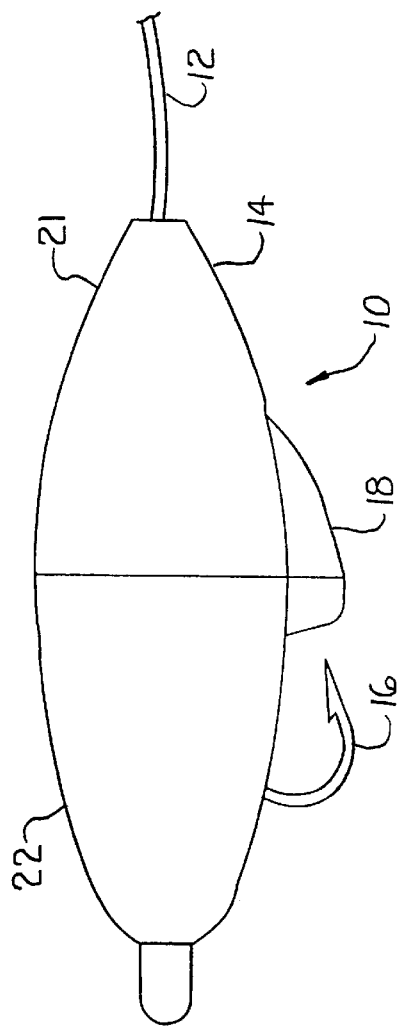
FIG. 1 is a side view of the fishing lure of the present invention.

Certain terminology will be used in the following description for convenience in reference only, and will not be limiting. For example, the words "front" and "rear" will respectively refer to the orientation of the fishing lure as it would travel through the water front first with the front oriented toward the fishing pole. The words "upwardly", "downwardly", "rightwardly", and "leftwardly" will refer to directions in the drawings to which reference is made. The words "inwardly" and "outwardly" will refer to directions toward and away from the geometric center of the assembly and the designated parts thereof. Such terminology will include the words specifically mentioned, derivatives thereof, and words of similar meaning.

DETAILED DESCRIPTION

Referring to FIG. 1, there is shown an assembled fishing lure 10 according to the present invention which includes an elongate fishing line 12, an essentially ovoid lure body 14, and a hook 16. The fishing line 12 is usually connected at one end to a fishing pole (not shown) in a conventional manner and connected at the other end to the hook 16. The lure body 14 at least partly houses the hook 16 so that the lure assembly is a "weedless" lure, i.e. the hook 16 is partly held in the lure body in a retracted storage position so that the risk of snagging debris and/or weeds is reduced. At the bottom of the lure body 14 is a fin 18 which extends radially outwardly and partially longitudinally on the outer surface of the lure body.

The lure body 14 includes a front section 21 and an aft section 22 which are joined together during assembly. The front section 21 (FIG. 2) has a generally conically shaped wall 24 extending rearwardly (leftwardly in FIG. 2) from a small diameter nose 26 to a large diameter base 27 and enclosing an axial through passage 28 about axis 29. The through passage 28 is enlargingly stepped from the nose 26 to the base 27 and rearwardly defines four distinct interior chambers 31–34, which will be discussed in greater detail below with regard to the assembly of the body sections 21 and 22.

Figure 2:
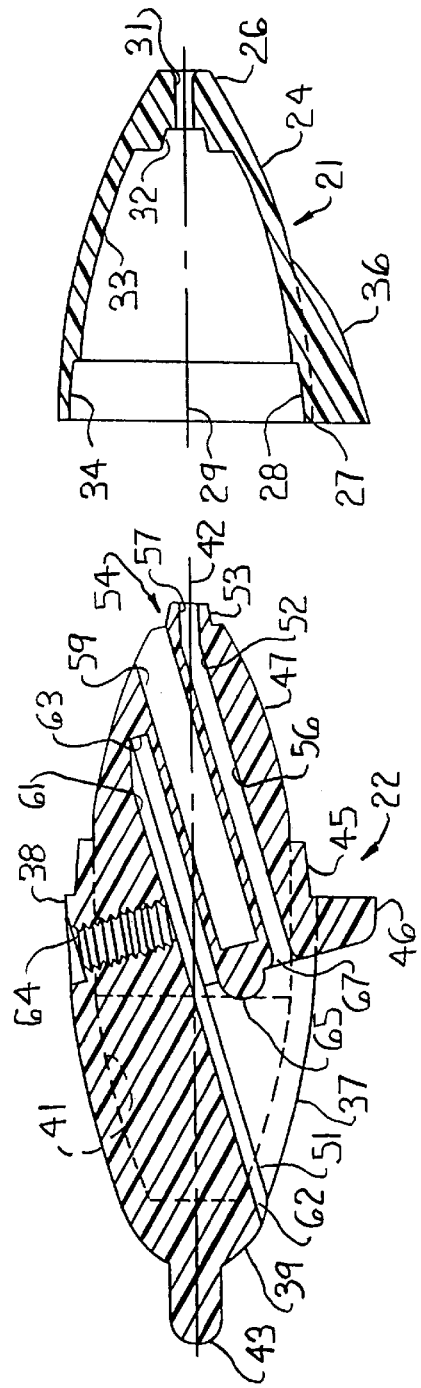
FIG. 2 is an exploded, cross sectional view of the lure body.

A front portion 36 of the fin 18 extends radially outwardly and rearwardly of the front section 21 and increases in radial length from front to rear thereof (right to left in FIG. 2). The fin front portion 36 begins intermediate the nose 26 and base 27 and integrally ends at the base.

The aft section 22 (FIG. 2) also has a generally conically shaped exterior wall 37 extending rearwardly from a large diameter base 38 to a small diameter nose or aft end 39 and enclosing a recessed interior 41 about axis 42. A generally cylindrical tail 43 extends axially rearwardly from the rearwardly positioned nose 39. An annulus 45 having a smaller outside diameter than the forwardly positioned base 38 extends forwardly (rightwardly in FIG. 2) from the base 38. A rear portion 46 of the fin 18 extends radially outwardly of the aft section 22 beginning at the base 38. The fin rear portion 46 has a longitudinal length less than the fin front portion 36 and ends intermediate the base 38 and nose 39.

A central wall 47 extends forwardly from the rear of the aft section 22 diametrally dividing the recess 41 into sideward compartments 48, 49 (FIG. 3) and protrudes frontwardly (rightwardly in FIG. 2) of the base 38 beyond the annulus 45. The wall 47 and fin 18 are radially aligned.

A recess 51 is defined in the bottom of the aft section 22 generally aligned with the wall 47 and fin 18 and beginning at the rear fin portion 46. The recess 51 opens radially downwardly or sidewardly and has a greater depth adjacent the fin 18 than the nose 39. The recess 51 and fin 18 have essentially the same width, measured in the circumferential direction of the lure body, which width is less than the width of the wall 47.

The wall 47 includes a through passage 52, a blind bore 59, and a channel 61 therein. The line-receiving through passage 52 is positioned in the wall 47 and extends forwardly from the recess 51 through an annular protuberance 53 at the front face 54 of the wall 47. A rearward portion 56 of the passage 52 inclines from the recess 51 to the axis 42 of the aft section 22, whereat an integral, relatively short front portion 57 of the passage 52 extends axially forwardly through the protuberance 53.

Directly above the passage 52 in the wall 47 is the blind elongate bore 59 which opens closely adjacent the protuberance 53 at the front face 54 of the wall 47 and extends essentially parallel to the rearward portion 56 of the passage 52.

Figure 5:
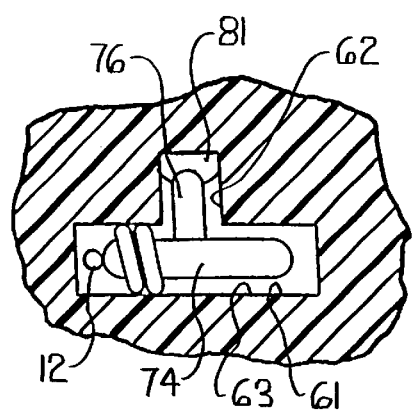
FIG. 5 is an enlarged cross sectioned view as generally taken from line 5—5 in FIG. 4.

The hook-receiving, blind elongate channel 61 is positioned in the wall 47 above the bore 59 and opens generally rearwardly into the recess 51. The channel 61 also extends parallel to the rearward portion 56 of the passage 52. In cross section (FIG. 5), the channel 61 has an inverted T-shape defined by an elongate stem 62 and an elongate transverse crosspiece 63, both recessed into the wall 47.

Both the stem and crosspiece 62 and 63 extend longitudinally of the aft section. The stem 62 is a groove which extends sidewardly away from the crosspiece 63 and extends throughout the length of the recess 51. The passage 52 and channel 61 have adjacent open ends which open rearwardly into the recess 51 to permit the fishing line to be inserted rearwardly through the passage 52 and looped forwardly into the channel 61 upon insertion of the hook 16 therein.

Also, a threaded through passage 64 extends sidewardly through the wall 47 and a top of the aft section 22 diametrally remote the fin rear portion 46 into and perpendicular to the hook-receiving channel 61. Preferably, the through passage 64 is perpendicular to the channel 61.

A radiussed bulb 65 extends rearwardly from a rear face 67 of the wall 47, which defines the forward face of the recess 51. The bulb 65 projects rearwardly into the recess 51 between the adjacent open ends of the line-receiving passage 52 and hook-receiving channel 61. The bulb 65 defines smooth arcuate slide surface along which the line 12 is freely slidable.

Figure 4:
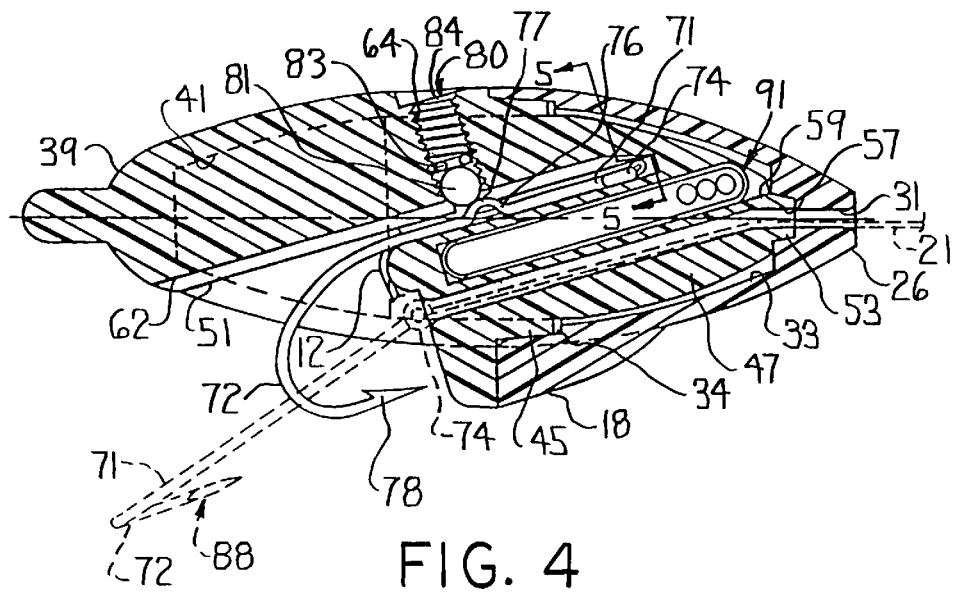
FIG. 4 is a cross sectional view of FIG. 1.

The hook 16 includes an elongate shaft or shank 71 integral with a barbed crook 72 (FIG. 4). At the end of the shaft 71 remote from the crook 72, an eyelet 74 is positioned. The eyelet 74 defines a through passageway for receiving the fishing line 12 to secure it to the hook 16 and can be created by bending an end portion of the shaft 71 back onto itself. The eyelet 74 extends in a plane that is generally transverse to, and preferably perpendicular to, the plane containing the crook 72. The shaft 71 includes a camber 76 located intermediate the eyelet 74 and the crook 72, which camber 76 extends transverse to, and preferably perpendicular to, the plane containing the eyelet. The camber 76 can be positioned in the same plane as the crook 72, which same plane is preferably perpendicular to the plane containing the eyelet 74. A barb 78 is positioned at the end of the crook 72 remote from the shaft 71 and can be in the same plane as the crook.

A tensioning mechanism 80 is positioned within the passage 64 and includes a securement member, here shown as a nonelastic ball 81, an elastic member, here shown as rubber O-ring 83, and a threaded screw 84. The securement member 81 has a diameter smaller than the inner open end of the passage 64 and larger than the width of the stem 62 of the hook-receiving channel 61, whereby the securement member 81 is freely movable in the passage 64, but cannot exit the passage 64 to completely enter the hook-receiving channel 61. Rather, only a portion of the ball 81 projects into the channel 61 to define a projection which cooperates with the camber 76 and impedes removal of the hook 61. It is also within the scope of this invention to provide stops in the hook-receiving channel 61 which do not interfere with the hook being received in the channel but prevent the ball 81 from completely entering the channel. The screw 84 threadedly engages the passage 64 and holds the elastic and securement members 83 and 81 within the passage 64 by contacting one side of the elastic member wherein the opposite side of the elastic member contacts the securement member such that the elastic member urges or biases the securement member toward the channel 61. The tensioning member 80 is adjustable between at least two tensioning settings, and preferably between a plurality of such tensioning settings. Each setting producing a biasing force holding the hook 16 in the channel 61.

Figure 3:
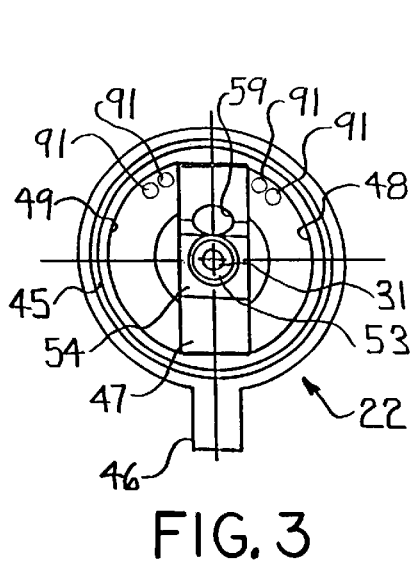
FIG. 3 is a front end view of the aft body section of the lure body.

The fishing lure assembly 10 is assembled as follows. First, rattles 91 are inserted into the recess 59 (FIG. 4) or into the side chambers 48, 49 (FIG. 3). The front and rear sections 21, 22 are fixed together by inserting the forwardly extending wall 47 into the middle chamber 33 with the protuberance 53 snugly received in the chamber 32. The rear chamber 34 snugly receives the annulus 45 whereat the front and aft sections 21, 22 are fixed together, for example by a snap fit or glue. Consequently, the front and aft sections 21, 22 are coaxially aligned as are the passage front portion 57 and front chamber 31 while the front and rear sections 36, 46 of the fin 18 are essentially abutted and longitudinally aligned. Further, the annular step in the wall 24 between the chambers 32, 33 covers the open end of the recess 59 preventing escape of any rattle members 91 positioned therein. In the alternative, if the rattles are positioned in the side chambers 48, 49, then the wall 24 of the front section 21 prevents escape of the rattle members while allowing enough space for the rattle members to move and rattle.

Now, the fishing lure body 14 is ready to receive the fishing line 12 and hook 16 in preparation for fishing. The fishing line 12 is first inserted rearwardly through the front chamber 31 of the passage 26 and thereafter through the passage 52, and thus extends through both the front and aft sections 21, 22 of the lure body 14 and exits into recess 51. The fishing line 12 that extends through the passage 52 is then tied to the eyelet 74 wherein the size of the eyelet 74 prevents the hook 16 from sliding forwardly into the open end of the passage 52.

To prepare the lure 10 for fishing, the hook 16 thereafter is inserted forwardly in the recess 51 to a retracted position with the camber 76 received in the stem 62. In particular, hook 16 and joined fishing line 12 are inserted, eyelet 74 first, into the inverted T-shaped channel 61 with the camber 76 still extending in the stem 62 and the eyelet extending into the crosspiece 63. Thereby, the hook 16 is non-rotatable relative to the channel 61 and hence the lure body 14. The fishing line 12 lies in the crosspiece 63 alongside the hook shaft 71 and exits rearwardly from the channel 61, and thereafter contacts against and turns 180 degrees about the bulb 65 before extending forwardly through the passage and chamber 52 and 31 toward the fishing rod.

The tensioning mechanism 80 holds the hook 16 in the channel 61 by first inserting the securement member 81, followed by the elastic member 83, and finally threading the screw 84 into the threaded passageway 64. The screw 84 presses the elastic member 83 downwardly in a transverse direction against the ball 81, which in turn contacts the camber 76 slightly rearward of the apex 77 thereof so as to hold the camber 76 forwardly thereof and the hook 16 within the channel 61. The crook 72 of the hook extends partly outwardly of the recess 51 with its barbed end being spaced rearwardly of and directly behind the fin 18 so that the fin can deflect debris, e.g. weeds, from contacting the barbed portion of the hook 16 exposed outwardly of the lure body 14, yet allow a portion of the crook 72 and barb 78 to possibly penetrate the flesh of a fish which has struck the assembled lure 10.

In use, the assembled lure 10 is pulled forwardly through the water, i.e. front section 21 first, by the fishing pole (not shown) and fishing line 12. The fin 18 deflects debris from the exposed portion of the hook 16 as the lure 10 moves through the water, while the rattles 91 move within the recess 59 or compartments 48, 49 so as to create noise and some nonuniform movement which may entice a fish to strike the lure. Once a fish strikes the lure 10, the fish applies a force to the lure 10 sufficient to overcome the force created by the tensioning member 80 which is holding the hook 16 in the channel 61. More specifically, when the lure 10 is pulled rearwardly with sufficient force by a fish or the fishing line is pulled forwardly with sufficient force by a fisherman, the camber 76 forces the ball 81 outwardly of channel 61 against the elastic member 83 which compresses to such an extent that the apex 77 of the camber slides rearwardly of the ball 81, and the hook 16 now freely slides rearwardly outwardly of the channel 61 to the extended position free of the lure body 14 illustrated in phantom outline in FIG. 4. In particular, the section of line 12 in the passage 52 is stationary or moves forwardly while the end portion of line 12 in the channel 61 moves rearwardly and outwardly thereof. The eyelet 74 has a width greater than the diameter of the through passage 52 so that the hook 16 is maintained in its freed position, shown at 88 in FIG. 4, outward and rearward of the lure body 14 and cannot be received in the passage 52. The radially offset, open rearward end of the passage 56 assists in guiding the hook 16 radially outwardly of the fishing lure body 14, thereby helping displace the lure body 14 away from the hook 16 which is embedded in the fish so that the fish cannot use the lure body to help it dislodge the hook.

To reset the assembled lure 10, the hook 16 is positioned in the recess 51 with the camber 76 in the groove-like stem 62 and thereafter slid into the channel 61 until the camber 76 contacts the ball 81. An increased force is then applied to the hook so that the camber forces the ball toward the elastic member 83 which elastically yields against this force so that the ball is displaced to allow the camber to slide forwardly therepast. The fishing line 12 now turns 180 degrees about the bulb 65 after it exits the channel 61 and enters the passage 52. Once the apex 77 of the camber 76 is positioned forwardly of the ball 81, the elastic member 83 urges the ball downwardly partially into the channel 61 to removably secure the hook therein. The same force which must be overcome to insert or load the hook 16 in the lure body 14 must be overcome to release the hook from the lure body past the securement ball 81.

Depending on the type of fish and the fishing environment, the force exerted by the tensioning mechanism 80 holding the hook 16 in the channel 61 can be adjusted. That is, the tensioning mechanism 80 can be moved to a plurality of different settings at which a certain holding force is created to hold the hook in the lure body. More specifically, if a greater holding force is desired such as in heavy weeds, the screw 84 is threaded farther into the passage 64 toward channel 61 and reduces the height of the elastic member 83 with the ball 81 contacting the camber 76. This increases the amount of force required to move the ball 81 away from the camber to further compress the elastic member 83 so as to allow the camber 76, and hence the hook 16, to pass rearwardly of the ball. Conversely, if a reduced holding force is desired, for example when a fish striking the lure 10 does not create sufficient force to release the hook 16, then the screw 84 is threaded away from the channel 61 so that the elastic member 83 is less compressed. Thus, less force is required for the camber 76 to slide rearwardly past the ball 81.

Further, while the camber 76 is preferred, the camber 76 may be omitted wherein the shaft instead is linear and the ball 81 frictionally engages the outer surface of the shaft. Also, the ball 81 and elastic 83 and even the screw 84 may be formed as a single component which frictionally contacts the hook 16.

Still further, while the two sectional lure body 14 is preferred, it is foreseen that the body can be constructed as a one-piece lure body having the required recesses, channel, and bore therein so that the one-piece body is constructed and operated essentially the same as the above discussed embodiment. However, the one-piece body would not need to be assembled together as the front and aft sections 21, 22 are assembled.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A weedless fishing lure, comprising:
   a body including a channel therein;
   a hook being movable between first and second positions, in said first position, said hook being removably fixed in said channel so as to assist in preventing said hook from snagging on debris and, in said second position, being released from said channel to ensnare a fish; and
   an adjustable tensioning mechanism mounted to said body and entering said channel to contact and hold said hook in said first position until a force of sufficient magnitude is applied thereto so as to overcome the force generated by said tensioning member holding said hook in said first position and release said hook into said second position with said tensioning member remaining on said body, said adjustable tensioning mechanism being adjustable between at least first and second tensioning settings, said first tensioning setting creating less of a force than said second tensioning setting for holding said hook in said channel.

2. The weedless fishing lure according to claim 1, wherein said hook includes an elongate shaft and a crook at one end of said shaft, said crook being adapted to ensnare a fish, said channel is elongate and receives said shaft, and said adjustable tensioning member at least partly enters said channel and is accessible for manual adjustment between at least said first and second tensioning settings from outside said channel.

3. The weedless fishing lure according to claim 2, wherein said body includes a radially outwardly extending fin, and said crook being positioned directly behind said fin so that said fin deflects debris from said crook as the fishing lure travels through water.

4. The weedless fishing lure according to claim 2, wherein said shaft includes a camber extending transverse to the elongate direction of said shaft, said camber having an apex at its farthest point from said shaft, said tensioning member includes a securement member extending into said channel and an elastic member resiliently urging said securement member into said channel, and in said first position of said hook, said securement member contacts rearwardly of said apex of said camber in the removal direction of said hook from said channel so as to hold said hook in said channel.

5. The weedless fishing lure according to claim 4, wherein said body includes a passage extending therethrough opening into said channel and receiving said securement and elastic members therein, and said tensioning mechanism includes a screw rotationally movably received in said passage for axially positioning said securement and elastic members in said passage, said screw compressing said elastic member between said screw and securement member so as to select the tension setting at which said elastic member urges said securement member against said shaft so as to hold said hook in said channel.

6. The weedless fishing lure according to claim 5, wherein said channel is blind and includes an integral stem and crosspiece which extends transverse to said stem, said shaft includes an eyelet essentially extending in a first plane, said camber extends in a second plane, said first and second planes are transverse to each other, and, in said first position of said hook, said eyelet is received in said crosspiece and said camber is received in said stem, said securement member extending into said stem and contacting said shaft rearwardly adjacent said camber so as to prevent said hook from freely sliding out of said channel.

7. The weedless fishing lure according to claim 6, wherein said body includes a fishing-line receiving passage extending from a front nose of said body and opening into a recess in said body, said fishing-line receiving passage and said channel extend at least partly parallel to each other and both open into said recess radially spaced from each other, and said body includes a bulb between the openings of said passage and channel, in said first position of said hook, said fishing line extends through said passage, around said bulb and into said channel.

8. A weedless fishing lure assembly, comprising:
   a fishing line including a free end;
   an elongate body including an elongate blind channel and a through passage therein, said through passage receiving said free end of said fishing line therethrough, said channel and passage being at least partly parallel to each other;
   an elongate hook including an end fixed to said free end of said fishing line, said hook in a first position being releasable fixed in said channel with said end thereof adjacent the closed end of said channel, and said hook in a second position being, along with said fishing line, released from said channel to ensnare a fish with said fishing line extending only through said passage; and
   said body including an adjustable tensioning mechanism entering said channel, said tensioning mechanism being connected to said hook, in said first position, until a pulling force applied to said hook by said fishing line reaches a release force of sufficient magnitude so as to release said hook from said body and into said second position.

9. The weedless fishing lure according to claim 8, wherein said channel and passage open adjacent each other at open ends thereof, and said body includes an arcuate bulb intermediate said open ends, said fishing line in said first position of said hook extending rearwardly outwardly of said open end of said channel, slidingly held against said bulb, and extending forwardly through said passage.

10. The weedless fishing lure according to claim 8, wherein said tensioning mechanism includes a projecting member which projects into said channel into engagement with said hook when said hook is in said first position, said projecting member preventing movement of said hook from said channel until said pulling force reaches said release force.

11. The weedless fishing lure according to claim 10, wherein said projecting member is resiliently movable.

12. The weedless fishing lure according to claim 11, wherein said tensioning mechanism includes a biasing member which resiliently biases said projecting member into said channel.

13. The weedless fishing lure according to claim 12, wherein said tensioning mechanism includes an adjustment member which is movable against said biasing member to press said projection against said hook, said adjustment member being movable toward and away from said projecting member to adjust the magnitude of said release force at which said projecting member permits movement of said hook.

14. A weedless fishing lure assembly, comprising:
    a fishing line including a free end;
    an elongate body including a channel which extends longitudinally in said body and a through passage extending longitudinally through said elongate body;
    a hook which includes an elongate shaft wherein said fishing line extends through said through passage and said free end is connected to said shaft, said hook being movable between a first position wherein said shaft is slidably received within said channel and a second position wherein said hook is released from said channel, said fishing line extending rearwardly through said through passage and forwardly into said channel when said hook is in said first position wherein said fishing line applies a pulling force to said hook upon a strike of a fish to pull said hook rearwardly from said first position to said second position; and a tensioning mechanism having a projecting member which projects into said channel and contacts said hook when said hook is in said first position to resist movement of said hook from said first position to said second position, said projecting member permitting sliding of said hook to said second position when a magnitude of said pulling force increases to a release force that overcomes the resistance of said projecting member.

15. The weedless fishing lure according to claim 14, wherein said shaft includes a hook projection thereon which engages said projecting member of said tensioning mechanism, said projecting member being resiliently movable to permit movement of said hook projection rearwardly past said projecting member when said pulling force reaches said release force.

16. A weedless fishing lure according to claim 15, wherein said tensioning mechanism includes an adjustment member which is engaged with said projecting member to adjust the magnitude of said release force.

17. A weedless fishing lure according to claim 16, wherein a biasing member is provided between said projecting member and said adjustment member to permit resilient movement of said projecting member.

* * * * *